(12) United States Patent
Nishimura et al.

(10) Patent No.: US 6,551,669 B2
(45) Date of Patent: Apr. 22, 2003

(54) MONOSTABLE FERROELECTRIC LIQUID CRYSTAL DISPLAY APPARATUS

(75) Inventors: Teiichiro Nishimura, Kanagawa (JP); Makoto Jisaki, Kanagawa (JP); Tadaaki Isozaki, Kanagawa (JP); Eiji Okabe, Chiba (JP); Ryushi Shundo, Chiba (JP); Hideo Saito, Chiba (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 09/783,859

(22) Filed: Feb. 15, 2001

(65) Prior Publication Data

US 2001/0030731 A1 Oct. 18, 2001

(30) Foreign Application Priority Data

Feb. 17, 2000 (JP) .......................................... 2000-045150

(51) Int. Cl.$^7$ .......................... G02F 1/133; G02F 1/141; C09K 19/34
(52) U.S. Cl. ................... 428/1.3; 252/299.61; 349/133; 349/172; 349/184
(58) Field of Search .................. 252/299.1, 299.61; 428/1.1, 1.3; 349/172, 133, 184, 188

(56) References Cited

U.S. PATENT DOCUMENTS 5,214,523 A * 5/1993 Nito et al. ................... 349/173

FOREIGN PATENT DOCUMENTS

| JP | 2000-314892 | * | 11/2000 |
| JP | 2000-319658 | * | 11/2000 |
| JP | 2000-336361 | * | 12/2000 |

OTHER PUBLICATIONS

English abstract for JP 2000–314892, 2000.*
English abstract for JP 2000–319658, 2000.*
English abstract for JP 2000–336361, 2000.*

* cited by examiner

Primary Examiner—Shean C. Wu
(74) Attorney, Agent, or Firm—Sonnenschein, Nath & Rosenthal

(57) ABSTRACT

The present invention provides a monostable ferroelectric liquid crystal display apparatus includes a pair of substrates, each subjected to uniaxial orientation processing and arranged so that their orientation processing directions are approximately parallel to each other; and a ferroelectric liquid crystal material having the chiral smectic C phase filled between the substrates, the liquid crystal material being such that the projection component of the cone drawn by a liquid crystal molecule of the ferroelectric liquid crystal material projected onto the substrate and the projection component of the liquid crystal molecule itself projected onto the substrate in the molecule axis direction are respectively identical to the orientation processing direction of the substrates, which state is the initial state of the monostable configuration, wherein the ferroelectric liquid crystal contains a compound having a phenyl pyrimidine skeleton having one end connected to an alkoxyl chain and the other end connected to an alkyl chain, wherein sum of carbons in the alkoxyl chain and the alkyl chain is 15. This enables to realize a monostable mode with a sufficient stability even at low temperature and a sufficient analog tone and contrast ratio.

3 Claims, 7 Drawing Sheets

MONOSTABLE FERROELECTRIC LIQUID CRYSTAL DISPLAY APPARATUS

RELATED APPLICATION DATA

The present application claims priority to Japanese Application No. P2000-045150 filed Feb. 17, 2000, which application is incorporated herein by reference to the extent permitted by law.

DETAILED DESCRIPTION OF THE INVENTION

1. Field of the Invention

The present invention relates to a novel monostable ferroelectric liquid crystal display apparatus using a liquid crystal material having a chiral smectic C phase.

2. Description of the Prior Art

Liquid crystal display elements have been widely used as light-weight thin type display elements. Among them, twisted nematic (TN) display elements of the TFT drive are especially widely used.

However, the aforementioned display element has various problems such as a tone reversal behavior in the middle tone, a narrow viewing angle, a slow response time such as several milliseconds or above, and the like. Especially the response time between the middle tones reaches as much as 100 milliseconds or above and the image display delay causes a tailing phenomenon.

In such a situation, a great expectation is posed on the ferroelectric liquid crystal as a liquid crystal material which improves the viewing angle and reduces the response time and its application for display is considered.

For example, Clark et al suggests a surface-stabilized ferroelectric liquid crystal display (SSFLCD) of the passive matrix drive method utilizing a bistable memory in which the helical pitch of the ferroelectric liquid crystal is untied in the narrow gap cell to realize bistability having two memory states (see Appl. Phys. Lett. 36, 899 (1980) and U.S. Pat. No. 4,367,924, Japanese Patent Publication 60-22287).

This SSFLCD has an advantage that it is possible to realize a white-black binary display element of a wide viewing angle.

However, for the image display speed increase, because of the passive matrix drive method, the response time for one pixel is as short as several microseconds but in the case of display having plenty of pixels, the speed is not always increased. Accordingly, the SSFLCD cannot be applied to the animation display in the multimedia era.

Furthermore, the number of pixels is gradually increased, starting in the so-called VGA, SVGA, XGA, SXGA, and UXGA. For the large-capacity display, a principle of high-speed display is expected.

To realize display of this high-speed response and wide viewing angle, the applicant of the present invention has suggested a monostable FLC mode in Japanese Patent Publication 4-212126 and U.S. Pat. No. 5,214,523.

This mode utilizes a liquid crystal element having a pair of substrates subjected to uniaxial orientation processing and arranged in such a manner that the orientation processing directions are almost in parallel to each other and a liquid crystal material having the chiral smectic C phase filled between the substrates. The component projected to the substrate in the axis direction of the cone drawn by the liquid crystal molecule of the liquid crystal material having the chiral smectic C phase and the component projected to the substrate in the molecule axis direction of the liquid crystal molecule itself are matched with the substrate orientation processing directions, respectively, which state is the initial state of the monostable configuration. A switching element is arranged for each of the pixels, i.e., the minimum unit for performing the active matrix drive. Voltage is applied to continuously change the liquid crystal director (molecule axis inclination) so as to perform analog modulation of the transmitting light intensity, thereby realizing an analog tone display of high speed and wide viewing angle as well as full-color display.

More specifically, a transparent electrode side of a glass plate on which a transparent electrode (ITO) is arranged is subjected to the silane coupling processing. After this, the spin coat method is used to apply a polyamide acid film, which is baked to form a polyimide film. This polyimide film is subjected to rubbing with a velvet cloth in one direction to obtain an orientated film. The orientated film has a thickness of about 200 Angstrom and is asymmetric with respect to the rubbing direction to obtain the liquid crystal orientation effect. Two of the glass plate each having the orientated film thus prepared are arranged in such a manner that the transparent electrodes oppose to each other and the rubbing directions are anti-parallel to each other, thereby assembling a cell with a 2-micrometer gap using an ultra-violet ray setting adhesive in which 2-micrometer micropal is dispersed. The liquid crystal material includes as the chiral component a compound (a) shown in Chemical Formula 2 below and as the non-chiral component, a tricyclic difluorine-based compound (b), phenyl pyrimidine-based compound (c), and phenyl benzoate-based compound (d), thereby realizing a monostable FLC mode.

[Chemical Formula 2]

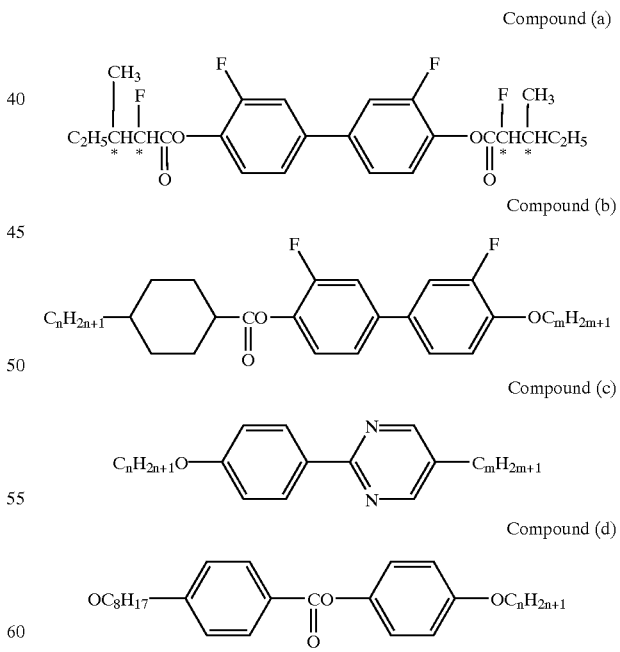

However, with the aforementioned liquid crystal composite material, it is impossible to obtain a sufficient black level sinking to obtain a sufficient contrast ratio. Moreover, the monostability of the aforementioned liquid crystal composite material when subjected to an electric field is insufficient.

Japanese Patent Publication 11-125182 discloses that the aforementioned liquid crystal composite material can increase the contrast ration when containing phenyl pyrimidine connected an alkyl chain having 17 carbons at the both ends. Moreover, Japanese Patent Publication 11-151755 discloses that the aforementioned liquid crystal composite material can increase its monostability when containing biphenyl pyrimidine connected to an alkyl chain having an even number of carbons at the both ends.

However, when the liquid crystal composition contains phenyl pyrimidine connected to an alkyl chain having 17 carbons at the both ends or biphenyl pyrimidine connected to an alkyl chain having an even number of carbons at the both ends, the melting point is increased and the liquid crystal material is crystalized at room temperature. For this, it is impossible to use a monostable ferroelectric liquid crystal apparatus prepared using this liquid crystal material at room temperature.

SUMMARY OF THE INVENTION

It is therefore an object of the present invention to provide a monostable ferroelectric liquid crystal display apparatus capable realizing a monostable mode with a sufficient stability even at room temperature and a sufficient analog tone and contrast ratio.

The inventors of the present invention, during development of a monostable ferroelectric liquid crystal display apparatus, found that a liquid crystal material containing dicyclic phenyl pyrimidine has a lowered melting point when the phenyl pyrimidine skeleton has one end connected to an alkoxyl chain and the other end connected to an alkyl chain wherein the sum of carbons in the alkoxyl chain and the alkyl chain is 15. This realizes a monostable mode specifically stable at the room temperature and improves the analog tone and the contrast ratio.

The monostable ferroelectric liquid crystal display apparatus according to the present invention includes: a pair of substrates, each subjected to uniaxial orientation processing and arranged so that their orientation processing directions are approximately parallel to each other; and a ferroelectric liquid crystal material having the chiral smectic C phase filled between the substrates, the liquid crystal material being such that the projection component of the cone drawn by a liquid crystal molecule of the ferroelectric liquid crystal material projected onto the substrate and the projection component of the liquid crystal molecule itself projected onto the substrate in the molecule axis direction are respectively identical to the orientation processing direction of the substrates, which state is the initial state of the monostable configuration, wherein the ferroelectric liquid crystal contains a compound having a phenyl pyrimidine skeleton having one end connected to an alkoxyl chain and the other end connected to an alkyl chain, wherein sum of carbons in the alkoxyl chain and the alkyl chain is 15.

By adding dicyclic phenyl pyrimidine having a phenyl pyrimidine skeleton having one end connected to an alkoxyl chain and the other end connected to an alkyl chain wherein the sum of carbons in the alkoxyl chain and the alkyl chain is 15, it is possible to realize a stable monostable FLC mode and significantly improve the analog tone, black level, and contrast ratio as well as lower the melting point although no detailed reason is known.

DETAILED DESCRIPTION OF PREFERRED EMBODIMENTS

Description will now be directed to a monostable ferroelectric liquid crystal display apparatus according to the present invention with reference to the attached drawings.

Figure 1:
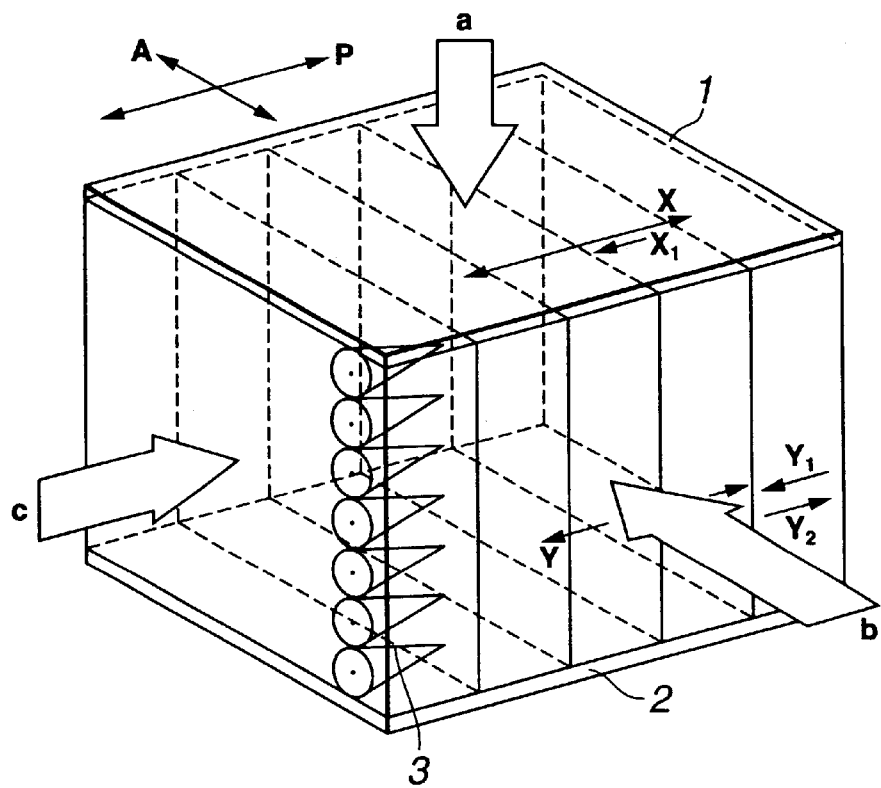
FIG. 1 is a perspective view schematically showing a configuration example of a liquid crystal cell in a monostable ferroelectric liquid crystal display apparatus.

The monostable ferroelectric liquid crystal display apparatus according to the present invention has a basic configuration as shown in FIG. 1 for example. That is, substrates 1 and 2 each has been subjected to the uniaxial orientation processing such as the rubbing and the oblique deposition are arranged with their surfaces opposing to each other, thereby constituting a liquid crystal cell and a space between the substrates 1 and 2 is filled with a liquid crystal material having the chiral smectic C phase (hereinafter, referred to as SmC* phase).

Each of the substrates 1 and 2 includes a transparent electrode formed on a transparent substrate and the transparent electrode is covered with a polyimide film, which is subjected to the rubbing or with an oblique deposition film. The substrates 1 and 2 are positioned so that their uniaxial orientation processing directions (indicated by X and Y in FIG. 1) are approximately in parallel to each other.

Here, the rubbing process is a technique to rub the surface of the polyimide film in one direction to cause fine scratches on its surface so as to obtain an orientation. The arrangement may be such that the rubbing directions are identical (completely parallel, hereinafter, referred to as parallel) or the rubbing directions are opposite to each other (hereinafter, referred to as anti-parallel). That is, the former is a case when the rubbing direction of the substrate 1 is $X_1$ while the rubbing direction of the substrate 2 is $Y_1$; and the latter is a case when the rubbing direction of the substrate 1 is $X_1$ while the rubbing direction of the substrate 2 is $Y_2$.

As has been described above, the upper and the lower substrates 1 and 2 are subjected to the uniaxial orientation processing and they are arranged with their orientation directions in approximately parallel to each other to constitute a liquid crystal cell, which is filled with a liquid crystal material having the SmC* phase. For example, when the liquid crystal material has a layered structure, the normal direction of each of the layer (or its projection component direction to the substrate) is matched with the aforementioned orientation process direction.

Figure 2:
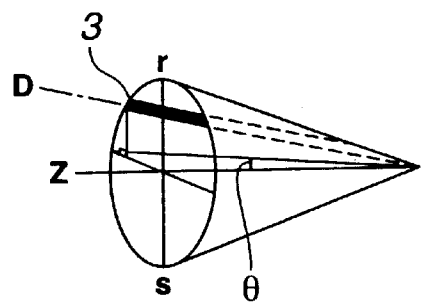
FIG. 2 schematically shows a cone drawn by a liquid crystal molecule.

Here, as shown in FIG. 2, a liquid crystal molecule 3 of each layer is rotated along the circumferential surface of a cone. The direction Z of the axis of the cone drawn by this liquid crystal molecule (or direction of its projection component to the substrate) is also matched with the aforementioned orientation process direction. Furthermore, the direction D of the director (molecule axis) of the liquid crystal molecule 3 itself (or the direction of its projection component to the substrate) is also matched with the aforementioned orientation process direction. That is, each of the liquid crystal molecules 3 is stabilized at the position of point r or point s on the cone circumference. This state is defined as memory cone 0 degree.

Accordingly, the ferroelectric liquid crystal display apparatus according to the present invention utilizes the stabilization effect of the liquid crystal molecule on the substrate surface. However, it is not the known bistability (memory cone 30 degrees to 45 degrees) or a one-side stability of stabilization in bistability, but monostabilized in a state between them (memory cone 2 degrees or less).

The aforementioned ferroelectric liquid crystal display apparatus, when viewed from the normal direction of the substrates 1 and 2, has a configuration that the uniaxial orientation directions X and Y of the substrates 1 and 2 in a state not subjected to an electric field, the axis direction Z of the cone drawn by the liquid crystal molecule 3, and the direction D of the director of the liquid crystal molecule 3 itself are matched with one another.

Here, while maintaining the polarization direction A of an analyzer orthogonal to the polarization direction P of a polarizer, if one of the polarization directions is matched with the aforementioned orientation process direction, no light penetrates and a black level is obtained.

In contrast to this, when an electric field is applied, the director of the liquid crystal molecule 3 is rotated along the cone and tilted continuously (in analog way) to the right or left according to the electric field intensity and the polarity, enabling to obtain a continuous tone (analog tone).

It should be noted that the electric field applied may have any drive voltage waveform but it is preferable to be an amplitude modulation type with an alternation between plus (+) and minus (−) almost satisfying the electrically neutral condition.

Figure 3:
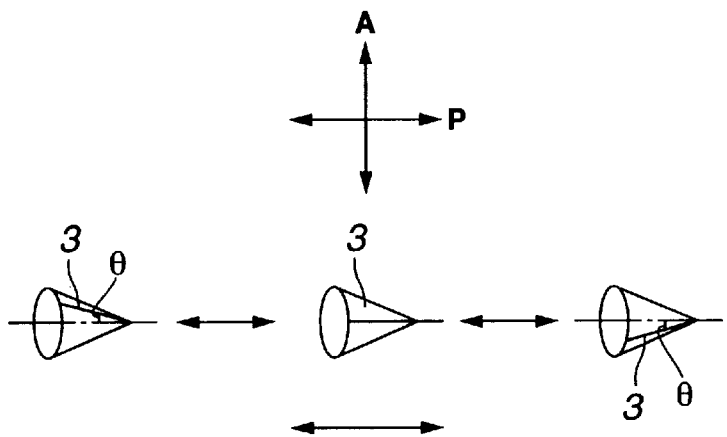
FIG. 3 schematically shows a behavior of liquid crystal molecules viewed from the direction indicated by the arrow "a" in FIG. 1.
Figure 4:
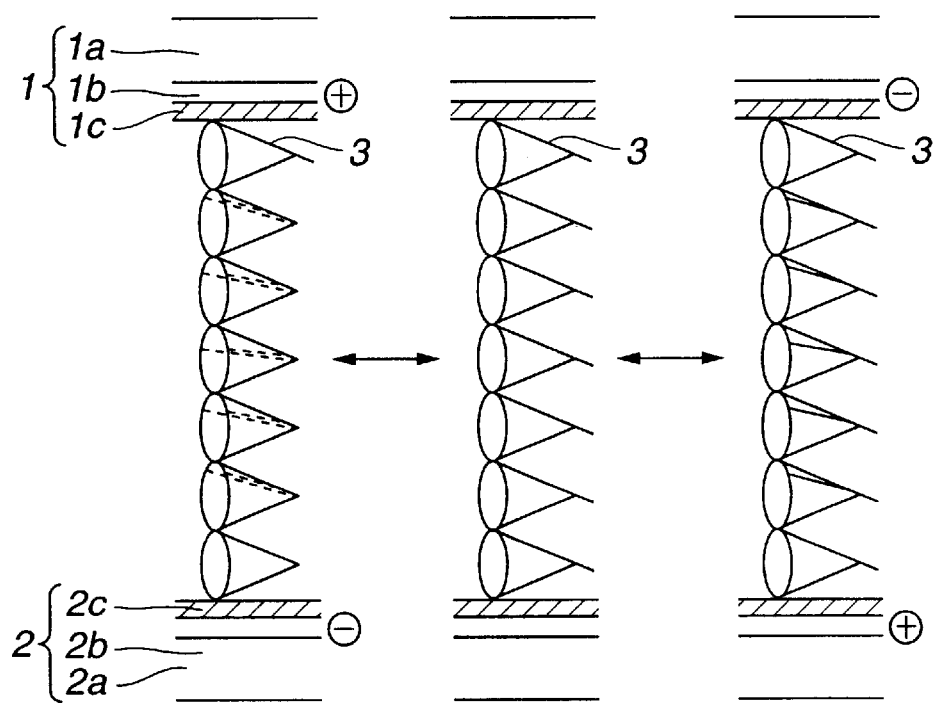
FIG. 4 schematically shows a behavior of the liquid crystal molecules viewed from the direction indicated by the arrow "b" in FIG. 1.
Figure 5:
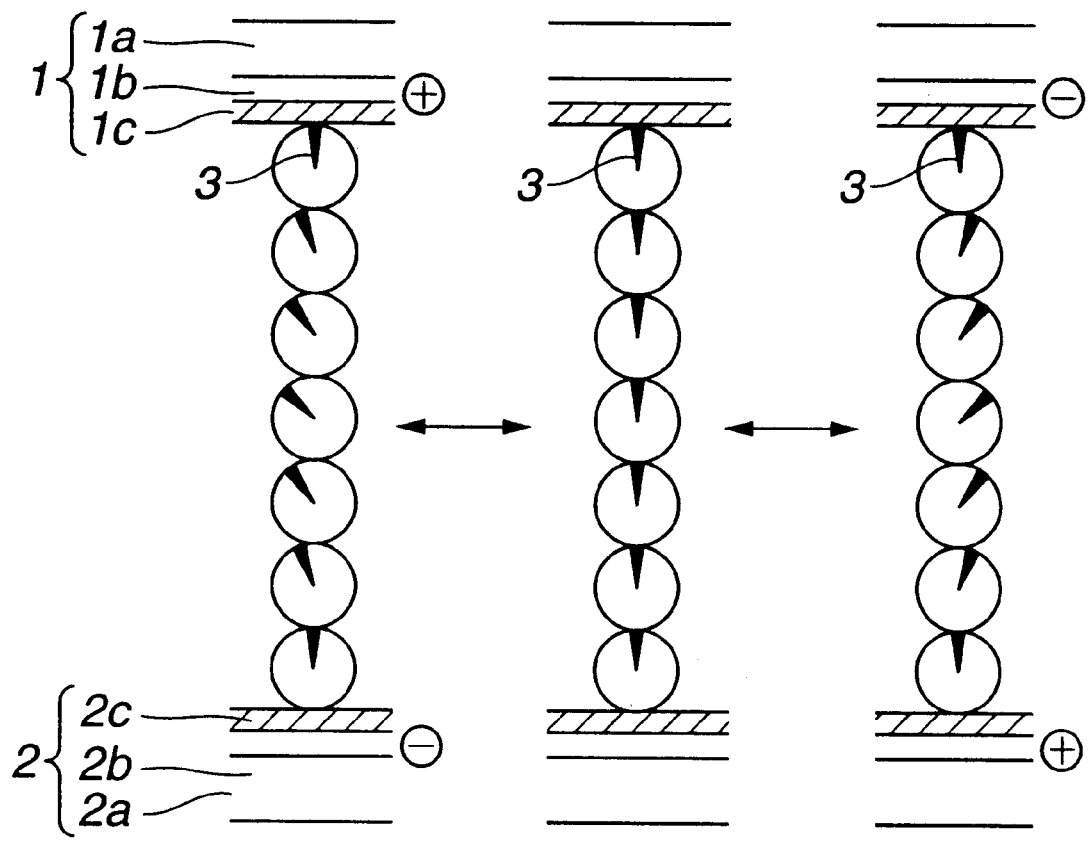
FIG. 5 schematically shows a behavior of the liquid crystal molecules viewed from the direction indicated by the arrow "c" in FIG. 1.

The behavior of the liquid crystal molecule is shown in FIG. 3 to FIG. 5. FIG. 3 shows the behavior of the liquid crystal molecule viewed from the direction "a" in FIG. 1. FIG. 4 shows the behavior of the liquid crystal molecule viewed from the direction "b" in FIG. 1. FIG. 5 shows the behavior of the liquid crystal molecule viewed from the direction "c" in FIG. 1. Moreover, in these figures, the substrates 1 and 2 are arranged as glass substrates 1$a$ and 2$a$ having transparent electrodes 1$b$ and 2$b$ and rubbing processed layers 1$c$ and 2$c$.

When no electric field is applied, the direction D of the directors of the respective liquid crystal molecules 3 are matched with the uniaxial orientation process direction of the rubbing processed layers 1$c$ and 2$c$ of the substrates 1 and 2. That is, as shown in the center of FIG. 3 to FIG. 5, the direction D of the directors of the liquid crystal molecules 3 are at the center of the projection plane of the cone.

This state is the monostable state. For example, when the polarization direction P of the polarizer is mated with the orientation process directions X and Y and the polarization direction A of the analyzer is orthogonal to this, no light penetrate, making a dark state.

On the other hand, for example, when plus (+) is applied to the transparent electrode 1$b$ of the upper substrate 1 and minus (−) is applied to the transparent electrode 2$b$ of the lower substrate 2, as shown at left of the respective figures, the liquid crystal molecule 3 is rotated in the counterclockwise direction (the rotation direction depends on the polarity of the spontaneous polarization of the liquid crystal material). Here, the apparent tilt angle θ is increased as the distance from the boundary with the rubbing processed layers 1$c$ and 2$c$ is increased. The reason is considered to be that the interaction is intense at the boundary with the rubbing processed layers 1$c$ and 2$c$, causing a so-called anchor effect.

Here, the maximum value $θ_{MAX}$ of the apparent tilt angle θ is determined by the electric field intensity. Accordingly, the tilt angle maximum value $θ_{MAX}$ is continuously changed according to the electric field intensity. Of course, this is accompanied by a continuous change of an average value $θ_{AVG}$ of the apparent tilt angle viewed as the entire liquid crystal cell.

Similarly, when a minus (−) electric field is applied to the transparent electrode 1$b$ of the upper substrate 1 and a plus (+) electric field is applied to the transparent electrode 2$b$ of the lower substrate 2, as shown at the right in the figures, the liquid crystal molecule 3 is rotated clockwise and the maximum value $θ_{MAX}$ and the average value $θ_{AVG}$ of the apparent tilt angle are continuously changed.

Here, the linear polarization from the polarizer causes a phase difference due to the tilt of the director of this liquid crystal molecule 3, thereby becoming an elliptical polarization. Accordingly, the penetrating light amount from the analyzer becomes greater according to the tilt angle average value $θ_{AVG}$. That is, the penetrating light intensity I in the liquid crystal cell can be expressed by Expression 1 below and is changed according to the apparent tilt angle average value $θ_{AVG}$, thereby enabling to obtain an analog tone.

$$I I_0 \sin^2 2θ \qquad \text{Expression 1}$$

wherein $I_0$ is the light intensity before penetrating through the cell.

After the external electric field is removed from the electric field applied state, the internal electric field in the liquid crystal and the stabilization effect on the boundary work to readily set the initial state.

In the aforementioned liquid crystal display apparatus, the liquid crystal material used may be any liquid crystal material which can have the SmC* phase. However, when considering the orientation characteristic, it is preferable that the SmC* phase have a sufficiently long helical pitch and further a great spontaneous polarization and exhibit the SmC* phase in a wide temperature range including the room temperature.

Accordingly, it is preferable to use a mixture of a conventionally known chiral liquid crystal and a non-chiral liquid crystal (host liquid crystal) such as tricyclic ester fluorine-substituted derivative, phenyl pyrimidine-based material, phenyl benzoate-based material, and the like.

Especially, in order to obtain a stable monostable structure, the non-chiral liquid crystal is preferably a phenyl pyrimidine-based liquid crystal, among which it is especially preferable to use a mixture of dicyclic phenyl pyrimidine and tricyclic phenyl pyrimidine. The phenyl pyrimidine-based liquid crystal is most preferable from the viewpoint of defects.

Moreover, when using the mixture of a chiral liquid crystal and a non-chiral liquid crystal, the amount of the chiral liquid crystal added to the non-chiral liquid crystal as the host liquid crystal affects the contrast and the response time. In order to maintain a practical response time as well as to realize a high contrast, the amount of the chiral liquid crystal added is preferable in a range from 1 weight % to 20 weight %.

The present invention is characterized in that the aforementioned liquid crystal material contains a compound having a phenyl pyrimidine skeleton having one end connected to an alkoxyl chain and the other end connected to an alkyl chain, and the sum of the carbons in the alkoxyl chain and the alkyl chain is 15.

More specifically, the compound added is expressed by Chemical Formula 3 and Chemical Formula 4 below in which m=8 and n=7, or m=7 and n=8.

[Chemical Formula 3]

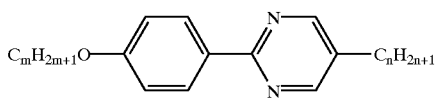

[Chemical Formula 4]

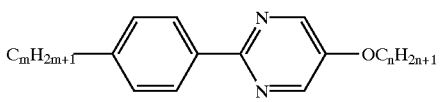

this lower the melting point of the liquid crystal material, realizing a monostable mode which is peculiarly stable even at room temperature. This improves the analog tone, the black level, and the contrast ratio.

It should be noted that the content of the aforementioned compound in the liquid crystal material is preferably in a range from 1 weight % to 60 weight %. If the content of the compound is below 1 weight %, the effect to lower the melting point of the liquid crystal material cannot be expected. Moreover, the content of the aforementioned compound is practically limited to 60 weight % and if the content exceeds 60 weight %, the temperature range capable of realizing the SmC* phase of the liquid crystal material is decreased.

EXAMPLES

Hereinafter, examples of the present invention will be explained through specific experiment results.

Preparation of the Display Panel

Firstly, explanation will be given on the method how the display panel to be used in the examples was prepared.

Figure 6:
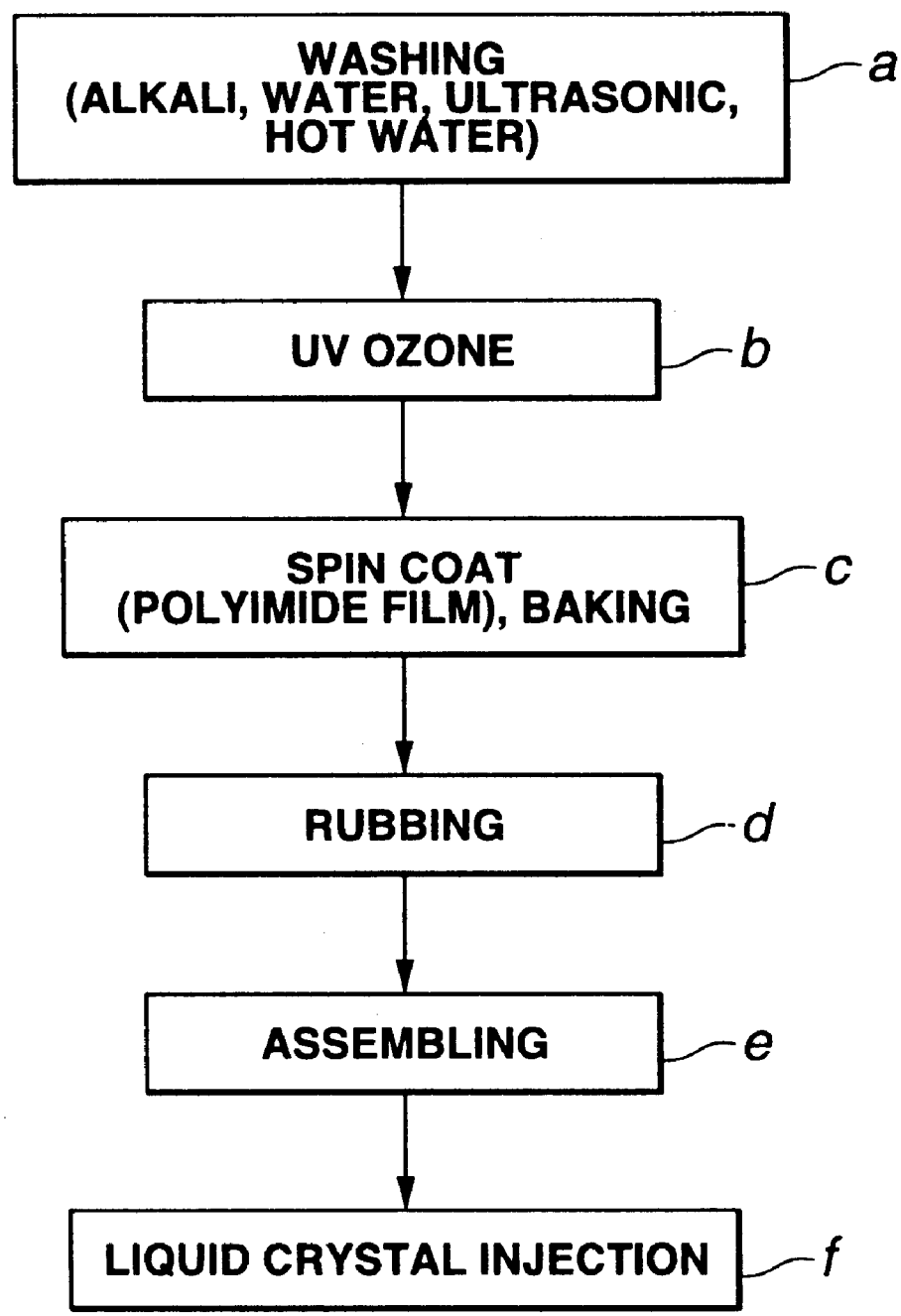
FIG. 6 is a flowchart showing a procedure for manufacturing a display panel.

Explanation will be given on a process preparing a panel using a glass cell (see FIG. 6).

a) Panel Cleaning (Step a and Step b)

ultrasonic washing using alkali, water shower 4 times (ultrasonic), hot water washing (step a), UV ozone processing (step b)

b) Polyimide Film Formation Step (Step c)

spin coating (1000 rpm/5 seconds, and 3500 rpm/30 seconds), and then placed in a nitrogen box for 1 day c) Rubbing (Step d)

As shown in FIG. 1, rubbing was performed so as to obtain an assembly parallel to the rubbing direction and in an anti-parallel state. The rubbing condition was set as follows: 300 rpm, table speed 2 mm/second, pushing-in amount 0.2 mm.

d) Assembling (Step e)

A seal agent was applied onto the opposing substrates by the screen printing method or using a dispenser and assembling was performed in parallel.

e) Injection (Step f)

The liquid crystal material to be injected is adhered to a top of an injection hole and injected by the capillarity using a hot stage (trade name FP82 produced by Mettler Co., Ltd.) under a temperature higher by 10 degrees C. to 20 degrees C. than the nematic-isotropic phase transition temperature. After this, a nitrogen gas was used to slowly return to the normal pressure and then to the normal temperature.

Example 1

A material consisting of compounds a to e shown in Chemical formula 5 below was used as a basic component of a liquid crystal material A and the melting point was measured. To this liquid crystal material A, alkoxyl phenyl pyrimidine shown in Chemical Formula 6 below was added in various amounts and the melting point and the memory cone were measured.

[Chemical Formula 5]

Compound (a)

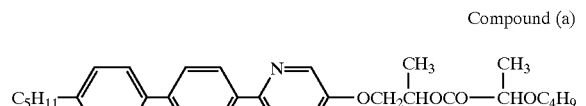

Compound (b)

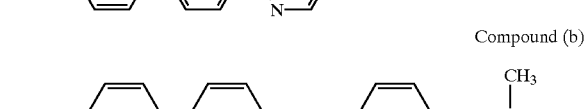

Compound (c)

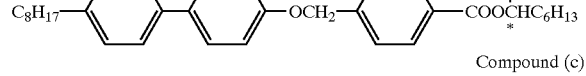

Compound (d)

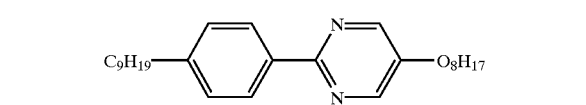

Compound (e)

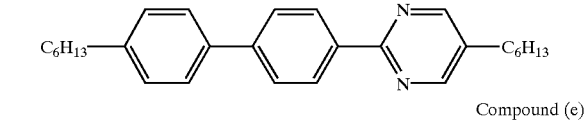

[Chemical Formula 6]

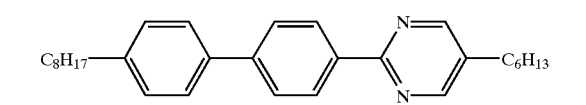

Example 2

Instead of the alkoxyl phenyl pyrimidine shown in Chemical Formula 6, alkoxyl phenyl pyrimidine shown in Chemical Formula 7 below was added to the liquid crystal material A and the melting point and the memory cone were measured in the same way as in Example 1.

[Chemical Formula 7]

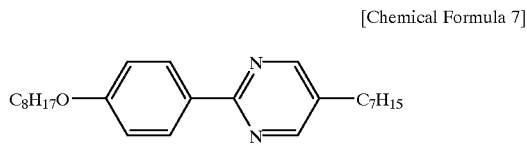

Example 3

Instead of adding only the alkoxyl phenyl pyrimidine shown in Chemical Formula 6, the alkoxyl phenyl pyrimidines shown in Chemical Formulae 6 and 7 below were added with a mixing ratio of 1:1 to the liquid crystal material A and the melting point was measured in the same way as in Example 1.

Comparative Example 1

Instead of the alkoxyl phenyl pyrimidine shown in Chemical Formula 6, alkoxyl phenyl pyrimidine shown in Chemical Formula 8 below was added to the liquid crystal material A and the melting point and the memory cone were measured in the same way as in Example 1.

[Chemical Formula 8]

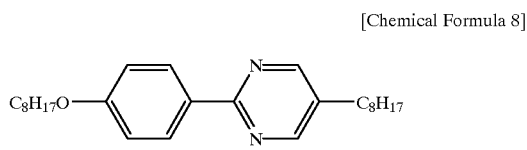

Comparative Example 2

Instead of the alkoxyl phenyl pyrimidine shown in Chemical Formula 6, alkoxyl phenyl pyrimidine shown in Chemical Formula 9 below was added to the liquid crystal material A and the melting point and the memory cone were measured in the same way as in Example 1.

[Chemical Formula 9]

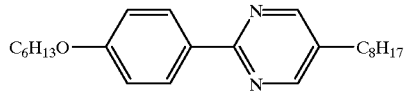

Figure 7:
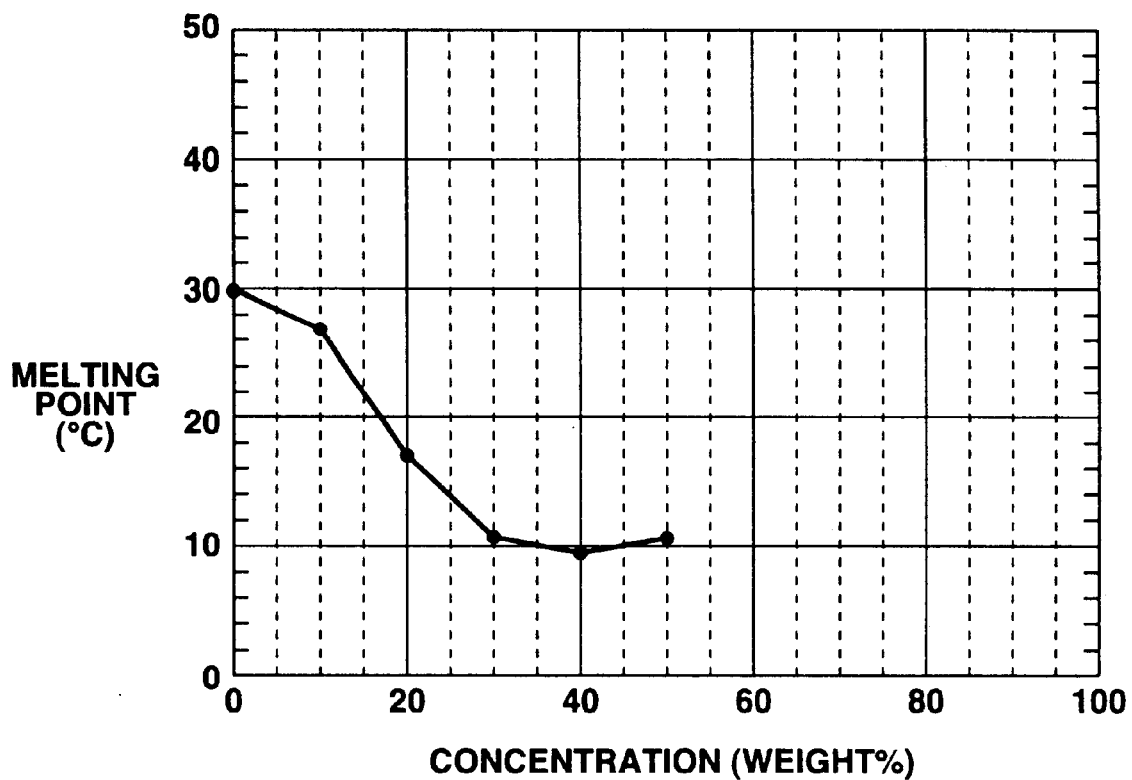
FIG. 7 graphically shows the relationship of the content of alkoxyl phenyl pyrimidine having 7 carbons in the alkoxyl chain and 8 carbons in the alkyl chain with the melting point of the liquid crystal composite material.
Figure 8:
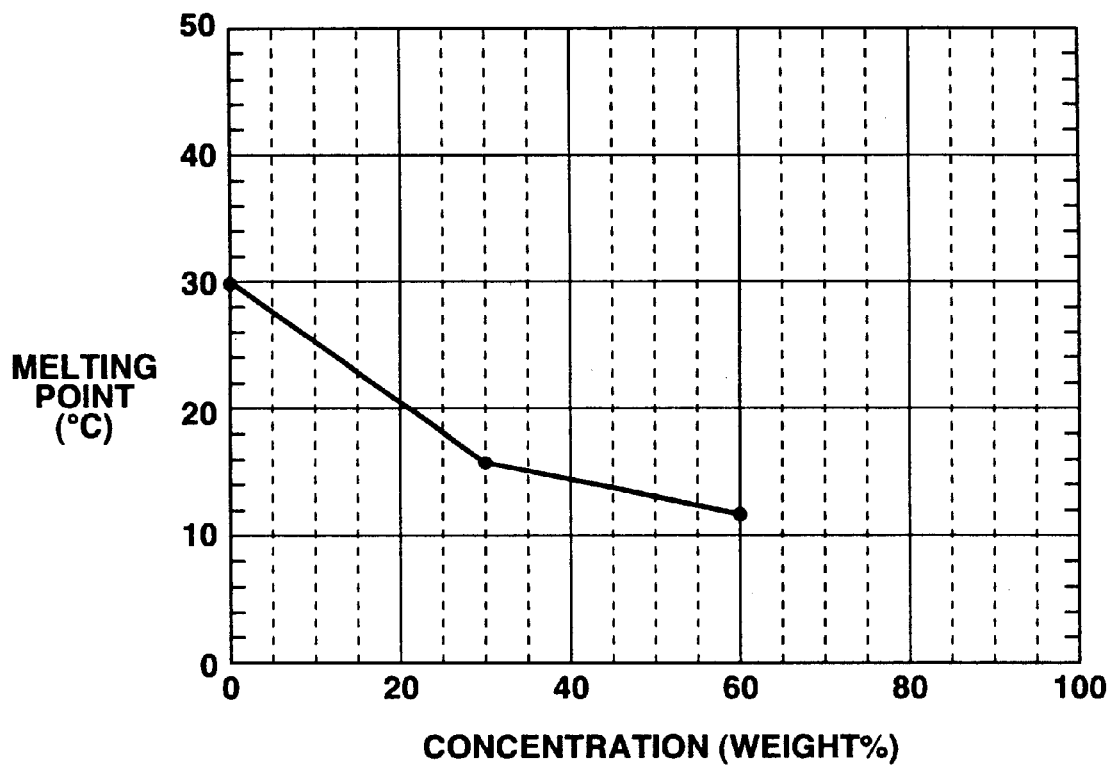
FIG. 8 graphically shows the relationship of the content of alkoxyl phenyl pyrimidine having 8 carbons in the alkoxyl chain and 7 carbons in the alkyl chain with the melting point of the liquid crystal composite material.

Firstly, FIG. 7 shows the measuring result of the melting point in Example 1; FIG. 8 shows the measurement result of the melting point in Example 2; and FIG. 9 shows the measurement result of the melting point in Example 3.

As shown in FIG. 7, when the alkoxyl phenyl pyrimidine shown in Chemical Formula 6 was added, the melting point of the liquid crystal material was already lowered when the concentration was 1%. The melting point was lowered down to 11 degrees C. when the concentration was 50%. Especially when the concentration was 40%, the melting point of the liquid crystal material was lowered down to 9 degrees C.

Moreover, as shown in FIG. 8, when the alkoxyl phenyl pyrimidine shown in Chemical Formula 7 was added, the melting point of the liquid crystal material was already lowered when the concentration was 1%. The melting point was lowered down to 12 degrees C. when the concentration was 60%.

Figure 9:
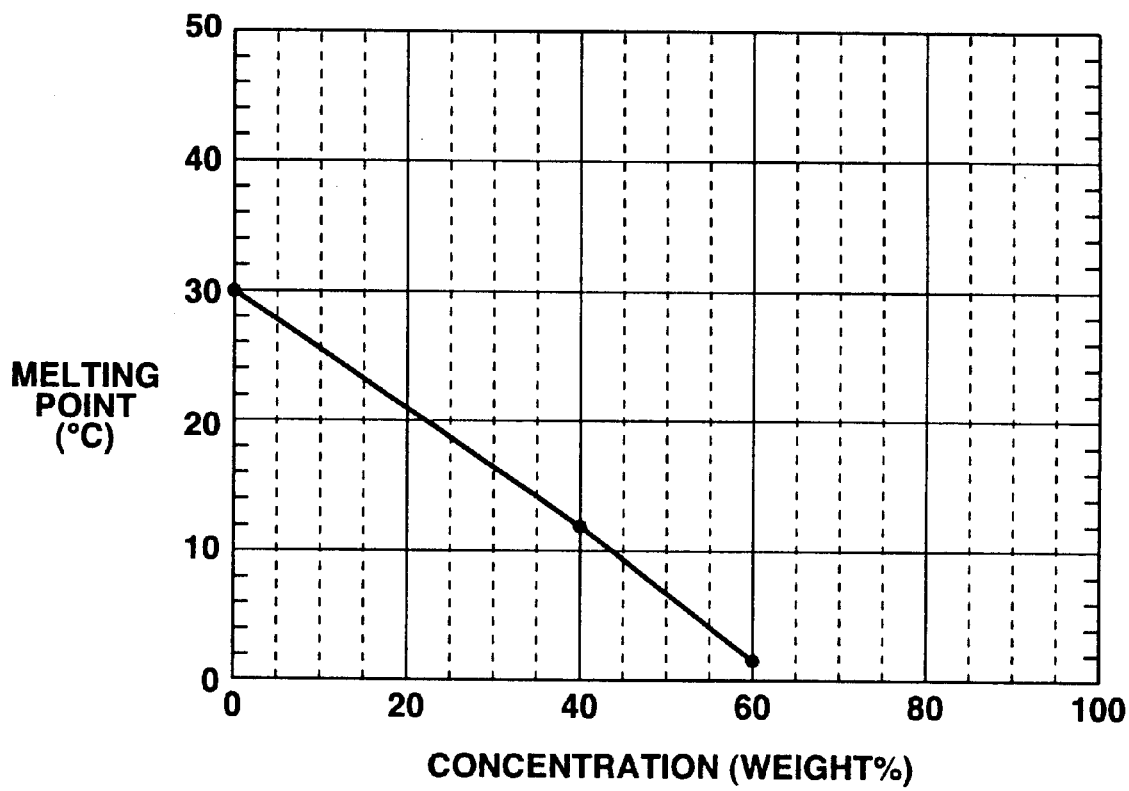
FIG. 9 graphically shows the relationship of the content of a 1:1 mixture of alkoxyl phenyl pyrimidine having 7 carbons in the alkoxyl chain and 8 carbons in the alkyl chain and alkoxyl phenyl pyrimidine having 8 carbons in the alkoxyl chain and 7 carbons in the alkyl chain with the melting point of the liquid crystal composite material.

Moreover, as shown in FIG. 9, when the alkoxyl phenyl pyrimidines shown in Chemical Formulae 6 and 7 were added with a mixture ratio of 1:1, the melting point of the liquid crystal material was already lowered when the concentration was 1%. The melting point was lowered down to 2 degrees C. when the concentration was 60%.

These results show that the melting point of the liquid crystal material can be lowered by adding a compound having a phenyl pyrimidine skeleton having one end connected to an alkoxyl chain and the other end connected to an alkyl chain, and the sum of carbons in the alkoxyl chain and the alkyl chain is 15.

Next, Table 1 shows the measurement results of the memory cone in Example 1, Example 2, Comparative Example 1, and Comparative Example 2.

TABLE 1

| | Memory cone (degree) |
|---|---|
| Example 1 | 0.0 |
| Example 2 | 0.0 |
| Comparative Example 1 | 2.9 |
| Comparative Example 2 | 3.2 |

As shown in Table 1, when the alkoxyl phenyl pyrimidines shown in Chemical Formulae 6 and 7 were added, the memory cone was 0 degree. In other words, monostability was maintained. However, when the alkoxyl phenyl pyrimidines shown in Chemical Formulae 8 and 9 were added, the memory cone was 2 degrees or more. In other words, it was impossible to maintain monostability.

This shows that it is possible to maintain monostability by adding a compound having a phenyl pyrimidine skeleton having one end connected to an alkoxyl chain and the other end connected to an alkyl chain, and the sum of the carbons in the alkoxyl chain and the alkyl chain is 15.

As is clear from the aforementioned, according to the present invention, it is possible to provide a liquid crystal material having a low melting point and stable monostable mode by adding a compound having a phenyl pyrimidine skeleton having one end connected to an alkoxyl chain and the other end connected to an alkyl chain, and the sum of the carbons in the alkoxyl chain and the alkyl chain is 15. This enables to provide a monostable ferroelectric liquid crystal display apparatus having a sufficient analog tone, a high contrast ratio, and a high black level even at the room temperature.

As is clear from the aforementioned, according to the present invention, it is possible to provide a liquid crystal material having a low melting point and stable monostable mode. This enables to provide a monostable ferroelectric liquid crystal apparatus having a sufficient analog tone, a high contrast ratio, and a high black level even at the room temperature.

What is claimed is:

1. A monostable ferroelectric liquid crystal display apparatus comprising:

a pair of substrates, each subjected to uniaxial orientation processing and arranged so that their orientation processing directions are approximately parallel to each other, and a ferroelectric liquid crystal material having the chiral smectic C phase filled between the substrates, in which both a projection component of an axis of a cone drawn by a molecule of the ferroelectric liquid crystal material onto the substrate and the projection component of the liquid crystal molecule axis onto the substrate are identical to the orientation processing direction of the substrates, wherein the ferroelectric liquid crystal contains a compound having a dicyclic phenyl pyrimidine skeleton having one end connected to an alkoxyl chain and the other end connected to an alkyl chain in which the sum of carbons in the alkyl chain is 15, wherein a weight % content of the compound in the liquid crystal material is in a range from 1 weight % to 60 weight % of the liquid crystal material.

2. The monostable ferroelectric liquid crystal display apparatus as claimed in claim 1, wherein the compound is at least one selected from compounds shown in Chemical Formula 1 below wherein m=8 and n=7, or m=7 and n=8.

[Chemical Formula 1]

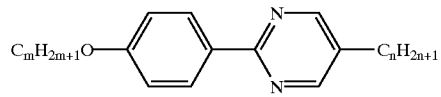

3. The monostable ferroelectric liquid crystal display apparatus of claim 1, wherein the ferroelectric liquid crystal material further comprises at least one of the group consisting of a chiral component having spontaneous polarization, dicyclic phenyl pyrimidine, and tricyclic phenyl pyrimidine.

* * * * *